Figure 1:
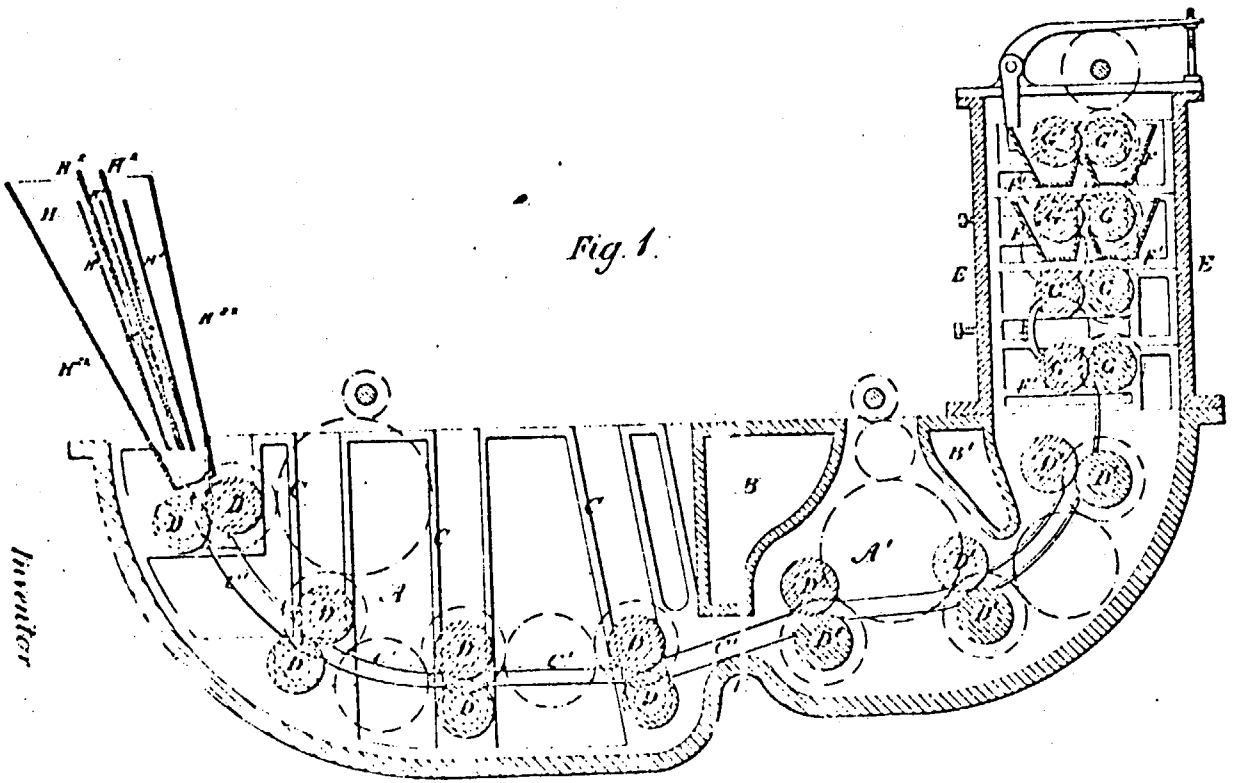

RE9,320 SR 117-52

BEST AVAILABLE COPY 117-52

3 Sheets—Sheet 1.

E. MOREWOOD.

Apparatus for the Manufacture of Tin and Terne Plate.

No. 9,320. Reissued July 27, 1880.

Inventor

E. Morewood

Witnesses

Chas. H. Smith

Geo. S. Pinckney for Samuel H. Ferrell atty.

X 37.2

X 101.6.2

COATING
Immersion
Rolls.

BEST AVAILABLE COPY

3 Sheets—Sheet 2.

E. MOREWOOD.

Apparatus for the Manufacture of Tin and Terne Plate.

No. 9,320. Reissued July 27, 1880.

Witnesses

Chas. H. Smith,
Geo. D. Buckney

Inventor

E. Morewood per Lemuel W. Serrell
Atty.

BEST AVAILABLE COPY
3 Sheets—Sheet 3.
E. MOREWOOD.
Apparatus for the Manufacture of Tin and Terne Plate.
No. 9,320. Reissued July 27, 1880.
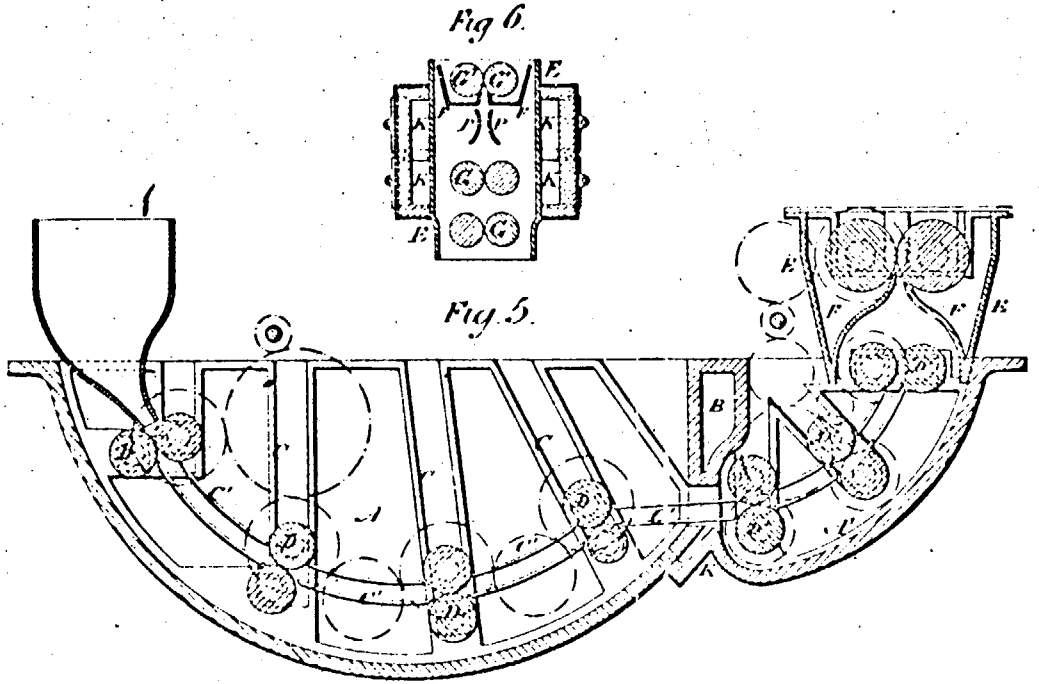
Witnesses
Inventor
E. Morewood
for Lemuel W. Serrell

SEARCH ROOM

BEST AVAILABLE COPY

UNITED STATES PATENT OFFICE.

EDMUND MOREWOOD, OF LLANELLY, SOUTH WALES.

APPARATUS FOR THE MANUFACTURE OF TIN AND TERNE PLATE.

SPECIFICATION forming part of Reissued Letters Patent No. 9,320, dated July 27, 1880.

Original No. 220,768, dated October 21, 1879. Application for reissue filed April 6, 1880. Patented in England January 28, 1879.

RD 220768

*To all whom it may concern:*

Be it known that I, EDMUND MOREWOOD, of Llanelly, in the county of Carmarthen, South Wales, tin-plate manufacturer, have invented new and useful Improvements in the Manufacture of Tin and Terne Plate, which improvements are fully set forth in the following specification, reference being had to the accompanying drawings.

This invention has for its object improvements in the manufacture of tin and terne plates or sheets.

For some years past I have been occupied with attempts to produce tin and terne plates at one operation with apparatus so arranged that a bare plate introduced into it at one end is delivered a finished tin or terne plate at the other end. Until now these attempts have not been completely successful. I have found that success, to a great extent, depends on the employment of a suitable flux at the entrance side of the apparatus. The flux which I now employ is a mixture of rosin, tallow, and other grease, or rosin or tallow, either separately or mixed with other grease or together; but these fluxes can only be successfully employed when a high temperature is maintained in the coating-metal pot, which necessarily leads to the production of a certain amount of "scruff." Hence these fluxes are useless for working in this manner unless there be also special arrangements on the exit side of the apparatus to prevent this scruff (which is carried forward by the plates) accumulating on the surfaces of the finishing-rollers, for it is essential to the production of perfect plates that the surfaces of the finishing-rollers should be kept clean.

It is also essential to the practical use of the fluxes mentioned above that a suitable flux-box should be provided to contain them.

I use a flux box or receptacle of a funnel-like form, having a long and narrow opening at the bottom, where it dips into the metal in the tinning pot, but widening out above to several times the area of the opening at the bottom.

The flux, as it becomes heated by the metal at the small area, where it is in contact with it, rises and mixes with the larger body of flux above. In this way overheating of the flux is avoided, and a suitable gradation of temperature is maintained in the flux-box, so that the moist plate, as it enters, meets first with comparatively cool flux, but traverses, in descending, hotter flux suitable to prepare it for the coating-metal.

It is obvious that a large body of comparatively cool flux in the upper part of the flux-box might also be obtained by increasing the height of the flux-box; but I find it convenient to increase the width, as stated.

I arrange apparatus in this flux-box so as to have more than one plate under the flux at a time, and by means of a lever or spring or trap the plate is detained in its passage through the flux, and when released is in a more suitable state for taking the melted metal when it enters the coating-metal than it would be if passed directly through the flux.

The way in which I prevent the scruff from accumulating upon the surface of the finishing-rollers, or the rollers revolving in the finishing-grease, is by keeping their surfaces washed with clean coating-metal supplied to them from a reservoir provided for the purpose, and I place troughs underneath the rollers to retain this clean metal, so that their under sides may be constantly immersed in it.

With this arrangement scruff which may be brought to these rollers will at once, as the rollers revolve, be transferred to the metal in the small troughs beneath, and will remain floating in these troughs or become mixed with the flux at the back of the top rollers, and may be skimmed off by the workman.

I also, in some cases, employ the clean coating-metal supplied to the finishing part of the apparatus to wash the surfaces of the plates before they reach the last pair of rollers, so as, as far as possible, to prevent the scruff reaching the last pair of rollers.

I sometimes arrange two surfaces of metal with a narrow space between them, through which the plate rises in the finishing-bath, and as it comes up it meets clean coating-metal flowing down between the surfaces.

In order that my invention may be most fully understood and readily carried into effect, I will proceed to describe the drawings hereunto annexed, which drawings, I may remark,

BEST AVAILABLE COPY are in part the same as the drawings which I annex to the specification of another patent application bearing even date with this patent application of which this is the specification, the said drawings being there employed to illustrate points of invention different from those which are claimed under the patent to which this specification applies.

In the drawings, Figure 1 is a longitudinal section of apparatus intended especially for the manufacture of tin-plate at one operation, but also very suitable for the manufacture of terne-plate.

A A′ is the pot in which the coating-metal is contained. It is divided into two parts by the air space or flue B, which, serving as a heat barrier, obstructs the passage of heat from one part of the pot to the other, and admits of the metal in the part A being kept at a much higher temperature than the metal in the part A′, although there is a passage connecting the two parts of the pot of sufficient width to give ready passage to the plates to be coated.

The pot is set in brick-work, as is usual, and beneath the part A a fire-place is formed for heating the pot, and it is so arranged that the heat from this fire shall not reach the bottom and over sides of the part A′, beneath which, however, another fire-place is formed, the use of this second fire being to warm the part A′ when commencing work after the apparatus has been allowed to get cool. At other times and when in regular working fire is needed in the fire-place under the part A′, but a current of cold air is allowed to pass through it to the chimney whenever the temperature of the part A′ of the pot tends to rise higher than the workman desires, and this current of air carries away heat from this part of the pot. Air-currents can also be allowed to pass to the chimney through the space or flue B and through the similar space or flue B′. These air-currents can be controlled by means of dampers. Other means may be taken to cool the end A′ of the pot when requisite; but I find the application of air-currents the most convenient.

C C are cast iron frames introduced into the part A of the pot at a short distance from the sides. These frames carry the bearings of the metal-coated rollers D D, which are geared together by spur-wheels contained in the spaces between the frames C and the sides of the pot. The arrangement of this driving-gear is indicated by dotted lines.

The part A′ of the pot contains other rollers, D′ D′. Their bearings are held in frames similar to the frames C, but not shown in the drawings. These rollers are driven at the same surface speed as the rollers D by gearing indicated by dotted lines.

E is the bath or vessel in which is contained the finishing grease—usually palm-oil or a mixture of palm-oil and tallow. A plan of this bath or vessel is given in Fig. 2. Within the bath or vessel E the frames F for holding the bearings of the rollers G are received and secured. Dotted lines show the gear for driving these rollers.

H is the entrance flux-box. Its lower and smaller end dips into the metal contained in the part A of the pot. The flux-box H is charged with a flux consisting, as I prefer, of sixty seven parts of rosin, twenty-three parts of tallow, and ten parts of palm-oil. Within the flux-box H there are stationary guides H′ H′, and in connection with these there are other guides, H², which are movable about centers H³, and springs or weights tend to close the lower ends of the movable guides H² against the fixed guides H′. There are thus four spaces in the flux-box H between the fixed and the moving guides, and each of these spaces is adapted to hold a plate to be coated. In working the apparatus each of these spaces in turn receives a plate from the hand of the workman, who, as he introduces each plate, moves the guide H² corresponding to the space which he is charging, in order that the plate which the space already contains may be able to pass out, and with the new plate he pushes down the plate which is to pass out until the first pair of the rollers D take hold of it. By this arrangement the plates are detained in the flux long enough to bring them to a suitable state and temperature to enter the coating-metal.

The number of plates which the flux-box is adapted to retain at one time may be varied. Four, however, is a suitable number to insure proper preparation when working rapidly. The pot is filled with metal so as completely to cover the first pair of rollers D, and so that these rollers may be clear of the scruff or impurity which floats upon the surface of the molten metal. The plates are carried forward by the rollers D, aided by the guides C′ C′, which are fixed to the side frames, and in their passage the somewhat highly-heated metal in the part A of the pot takes onto the plate and gives to it a sound coating. The plate then passes on through the narrow opening left for it between B and K into the cooler part A′ of the pot. The temperature of this plate is thus rapidly reduced, and the coating upon it is brought to a state fit for finishing.

If any of the scruff which forms in the hot end of the pot should be carried forward with the plate into the part A′, a larger portion of it will rise immediately to the surface of the metal, and the flue B′, acting as a barrier, will hinder it reaching the finishing grease contained in the bath or vessel E. The plate, emerging from the molten metal, enters the finishing grease and is carried up through it by the coated rollers G. The distances between these rollers can be adjusted by means of regulating-screws acting through springs, and in the case of the uppermost rollers, G′, where it is necessary that the adjustment should be completely under control, the screws act upon the bearings of the roller through spring-levers.

Beneath the uppermost rollers, G′, troughs

SEARCH ROO

BEST AVAILABLE COPY

F F are fixed, and in these troughs clean coating metal is contained, and there is grease at the back of the rollers. This metal serves to keep the surfaces of the rollers in good condition by washing off scruff or impurities which are brought to them by the plates rising up through the grease from the coating-metal. A good supply of metal given to the troughs F will cause the surface of the plates to be well washed.

The supply for the troughs F is derived from supply-vessels, which, however, are not shown in the drawings. There is a supply-vessel for each trough. It may be arranged immediately in front of or behind the trough, as may be found most convenient, and is, by preference, made long and narrow, so that it may occupy but little room in the bath or vessel E, which, however, may be made somewhat wider than the drawings represent, in order the better to accommodate these supply-vessels.

The supply-vessels are immersed in the grease in the bath or vessel E, the heat from which serves to keep the metal in the supply-vessels in a melted state, and with the same object the supply-vessels may also be made deep, so that the lower part of the supply-vessels may dip into the metal in the pot A', in order that the heat may be more rapidly communicated from the metal in the pot to the supply-vessels; or, in place of making the supply-vessels of this great depth, they may be made with pins or legs of metal long enough to become immersed at their lower ends in the metal in the part A' of the pot.

Slits or orifices in the sides of the supply-vessel allow the metal to flow out into gutters or pipes which lead the metal into the troughs F. The supply can be regulated by slides covering the slits or orifices to a greater or less extent.

The extensions E' E' of the bath or vessel E overhang the pot, and they have floors or bottoms, whereas the central part of the bath E is without a bottom, the grease in it resting on the melted metal on the exit side of the coating-pot. On one side of the pot a notch or recess is formed to allow of the bottom of the extensions E on this side to be at a somewhat lower level than the edge or flange of the pot, so that occasionally, as hereinafter explained, the pot may be filled sufficiently full of metal to cause it to flow over the bottom of the extension E' on this side, although the ordinary level at which I work is just beneath it.

Figure 2:
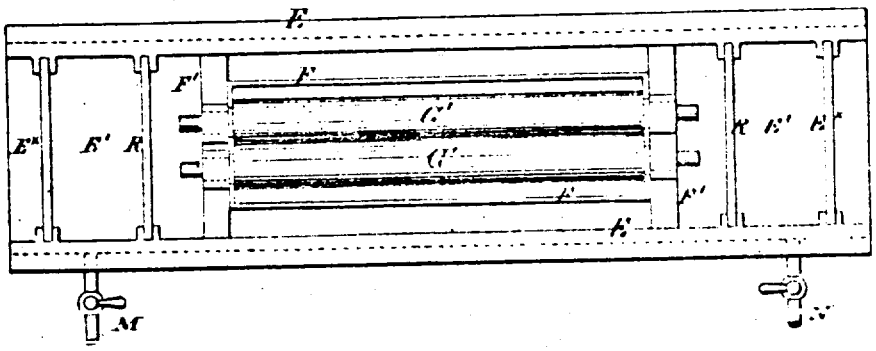
Figure 3:
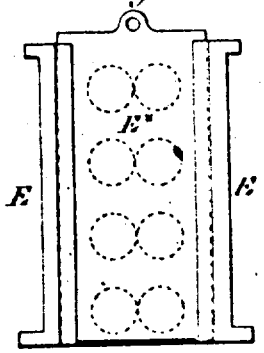
Figure 4:
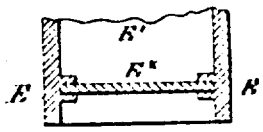

Fig. 2 is a plan view, and Fig. 3 an elevation, of the extension E'. It is closed by a slide, E'', (also seen in section in Fig. 1.) The slide works in a groove, and a little packing of hemp or hemp-fabric may advantageously be placed in the groove, so that the slide may work easily and yet remain tight. From the nature of the grease, however, but little difficulty will be found in keeping the slide sufficiently tight, and any grease which may leak out flows to a cistern, in which it is collected.

When it is desired to draw off impurities from the surface of the metal beneath the rollers G, metal is put into the pot until the metal rises into the end E', to which the slide E'' is fitted, and then the slide is slightly raised, so that the metal may flow out beneath it, and with this metal grease, settlings, and impurities floating on its surface will pass out.

I prefer to arrange slides E'' in connection with the extension at each end of the bath E, and I also provide other slides or movable partitions, E', by which the extensions can be shut off from the body of the bath E. By thus closing for a time the communication between the bath and the connections the warming up of the apparatus when commencing to work is facilitated and the extensions or ends are rendered more accessible for cleaning.

As is seen in Fig. 2, there is a pipe, M and N, fitted with a tap, in connection with each of the extensions or ends E'. They enter near to the bottom. One of these pipes—say M—is in connection with a cistern at a higher level, in which a supply of cool but fluid and suitable grease is kept, and by adjusting the tap, or, preferably, by means of a float in the extension E', the amount of this cool grease flowing into the bath E can be regulated. The other pipe, N, leads to a receiver at a lower level, and it serves for the outflow of hot grease and of grease which, by use, has become thick, and which requires to be allowed to settle and deposit impurities before it will be again suitable.

By means of the tap the outflow can be adjusted, and so a perfect control is obtained both of the temperature and quality of the grease in the bath E.

The supply of grease may be poured into the bath by hand from time to time, although much less conveniently than by the arrangement which I have described; but removal of the grease by bailing out would not give any satisfactory result, as the overheated and impure grease near the bottom could not be thus removed conveniently.

Fig. 5 is a longitudinal section of an apparatus which differs in some details from that shown in Fig. 1. This apparatus is intended especially for the manufacture of terne plate; but it may be used also for the manufacture of tin plate, although I do not recommend it for that purpose. It is provided with a flux box on the entrance side, which is of a funnel-like form, and it dips at its lower end into the metal in the pot to a depth sufficient to maintain the column of the flux.

On the exit side the bath E is formed with troughs F, containing clean coating metal for the supply of the uppermost rollers.

The bath or vessel E has extensions E', as already described; but they are shallower than the extension in Fig. 1, as in this case the finishing grease stands considerably below the level of the uppermost rollers, and there is an air space between the surface of the grease and the nip of these rollers.

Where the bath containing the grease on

BEST AVAILABLE COPY the exit side is deep, as it is in the apparatus which I prefer for tin-plate, I sometimes, in order to have more complete control over the working, provide air-flues in connection with it, as is shown in Fig. 6. In this figure, K K are flues running along the sides of the bath E, and there are suitable connections provided with dampers, by which either cold air to carry away heat can be admitted through these flues to the chimney, or by which, before commencing to work, when the apparatus is cold, hot air from the fire may be conducted.

In some cases I find it advisable to fix facing-plates in the bath E, and the plates under treatment have to pass between them as they rise to the uppermost rollers, as before intimated. P P in Fig. 6 represent the facing-plates, made of steel or wrought-iron. They are themselves carefully coated before they are put to work, and they are supplied with clean coating-metal either by causing the troughs F, which supply the rollers above, to overflow or, as is to be preferred, a separate supply from the store-vessel is conducted to them by channels provided for the purpose.

The facing-plates are set at a distance apart such that the plates can pass quite freely between them; but nevertheless, being stationary, they retain to some extent the supply of coating metal between them, and this metal washes the surface of the plate and tends to prevent impurities reaching the surfaces of the uppermost rollers.

Where facing-plates are not employed it is sometimes advisable to give a separate supply of coating-metal to a pair of the rollers G, and for this purpose troughs F may advantageously be applied to such rollers, as shown in Fig. 1. Thus I am enabled to insure that the plates shall be well washed with clean metal before they reach the uppermost rollers without giving too liberal a supply of metal to the uppermost rollers themselves, which might cause the plates to be coated more thickly than was required.

I claim as my invention—

1. In an apparatus for coating sheet metal with tin, lead, or their alloys and finishing it at one operation, the coating or tinning pot, which, by one or more flues, B, or other barriers, is formed into compartments A A′ for melted metal of different temperatures, and is provided with rollers D D′, which convey the plates through melted metal and finishing-grease, substantially as described and shown.

2. The detaining pieces or levers H′, in combination with springs and stationary guides H′ in an entrance flux-box adapted to contain hot flux for the purpose of keeping the plates immersed in it for a time, substantially as described.

3. The bottomless grease-box E, provided with coating or finishing rollers and with the extensions E′, provided with bottoms and adapted to contain cooler grease, the slides E* and R, or cocks or other means of regulation, for the purpose of regulating the temperature of grease in the grease-box E and of clearing away the scruff, substantially as described.

4. The method of coating metal plates or sheets with tin, lead, or their alloys and finishing them in one operation, consisting in passing them through a suitable flux, then through a body of melted coating-metal of a high temperature, then through a body of melted cooling metal of a lower temperature, and then through grease and between finishing-rollers, substantially as set forth.

5. The method herein specified of coating metal plates or sheets with tin, lead, or their alloys, and finishing them at one operation and without their passing into the air, consisting in introducing them into a bath of flux that is comparatively cool at the place of insertion and hot at the junction of the same with the melted metal, passing them through melted coating-metal of a high temperature, and then through melted metal of a lower temperature, and then between finishing-rollers revolving in contact with melted grease and metal, substantially as set forth.

EDMUND MOREWOOD.

Witnesses:

JAMES FREDERICK PHILLIPS,
PETER JENSEN,
33 *Chancery Lane, London.*